United States Patent [19]

Jan et al.

[11] Patent Number: 5,144,822
[45] Date of Patent: Sep. 8, 1992

[54] AUTOMOBILE STEERING LOCK

[76] Inventors: Shwu-Meei Jan, No. 7-2, Alley 13, Lane 54, Sec. 2, Hsing-Nan Road, Jung-Heh, Taipei Hsien; Hsien-Pao Chen, No. 76, Lane 274, Jung-Jeng S. Road, Yung-Kang Shiang, Tainan Hsien, both of Taiwan

[21] Appl. No.: 597,045

[22] Filed: Oct. 15, 1990

[51] Int. Cl.$^5$ ............................................. B60R 25/02
[52] U.S. Cl. ........................................ 70/209; 70/226; 70/380
[58] Field of Search ................. 70/209, 211, 212, 225, 70/226, 237, 238, 380

[56] References Cited

U.S. PATENT DOCUMENTS

| | | | |
|---|---|---|---|
| 3,190,090 | 6/1965 | Zaidener | 70/238 |
| 4,730,470 | 3/1988 | Zane et al. | 70/238 |
| 4,738,127 | 4/1988 | Johnson | 70/209 |
| 4,747,279 | 5/1988 | Solow | 70/211 X |
| 4,887,443 | 12/1989 | Wang | 70/226 X |
| 4,935,047 | 6/1990 | Wu | 70/238 X |

FOREIGN PATENT DOCUMENTS 1127524 9/1968 United Kingdom .................. 70/226
2024307 1/1980 United Kingdom .................. 70/238

*Primary Examiner*—Lloyd A. Gall
*Attorney, Agent, or Firm*—Bacon & Thomas

[57] ABSTRACT

An antitheft device for attachment to a steering wheel of an automobile comprising an elongated body member having two parallel passageways extending along the longitudinal direction, a first hook secured to the body member for engagement with a portion of the steering wheel wherein the first hook engages the wheel from the inside thereof with the body member extending outward beyond the periphery of the steering wheel, a first elongated rod member adapted to move in telescopic fashion in one of the passageways of the body member, a second hook secured to the first hook for engaging the inside portion of the steering wheel diametrically opposed to the first hook, a second elongated rod member adapted to move in telescopic fashion in the other passageway and in a direction reverse to the first rod member, and the rod members may fully extend with respect to the body member to be locked at any of a plurality of selectable positions and prevented from being released from the body member.

3 Claims, 6 Drawing Sheets

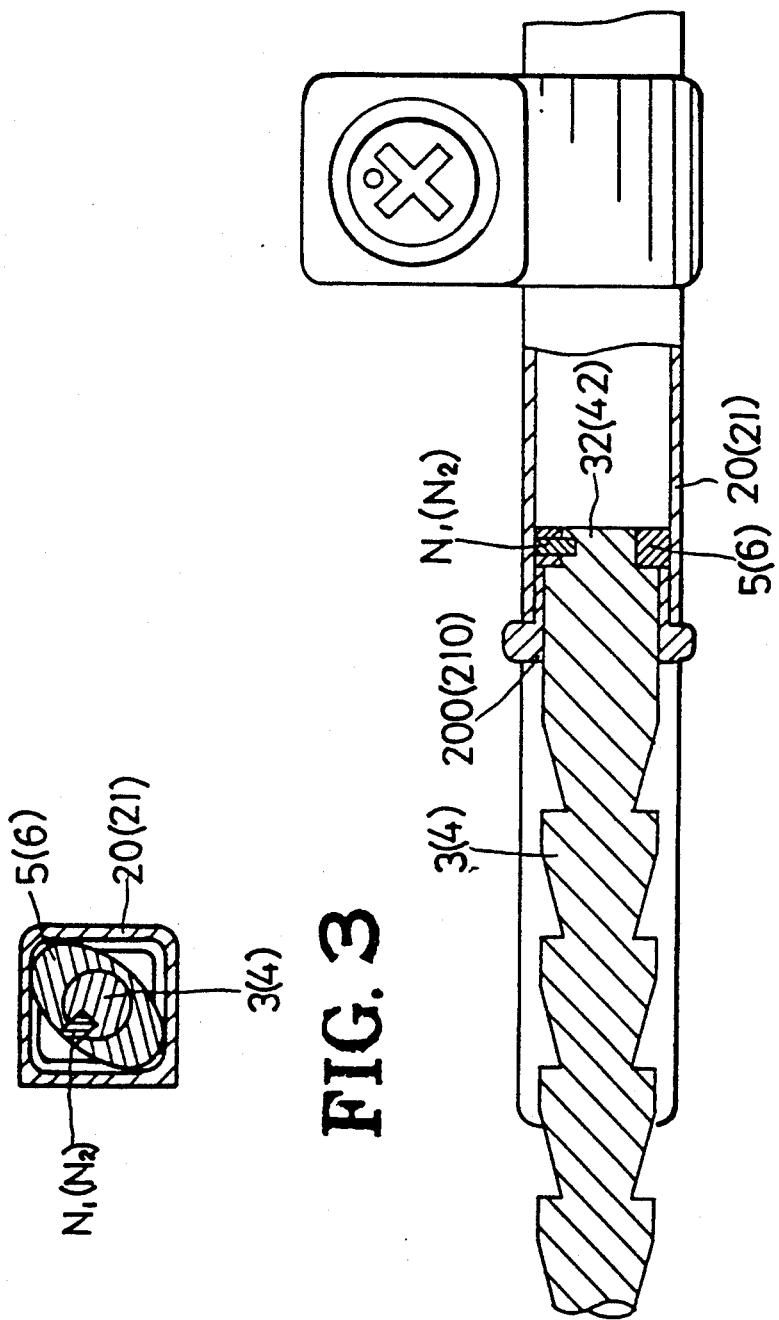

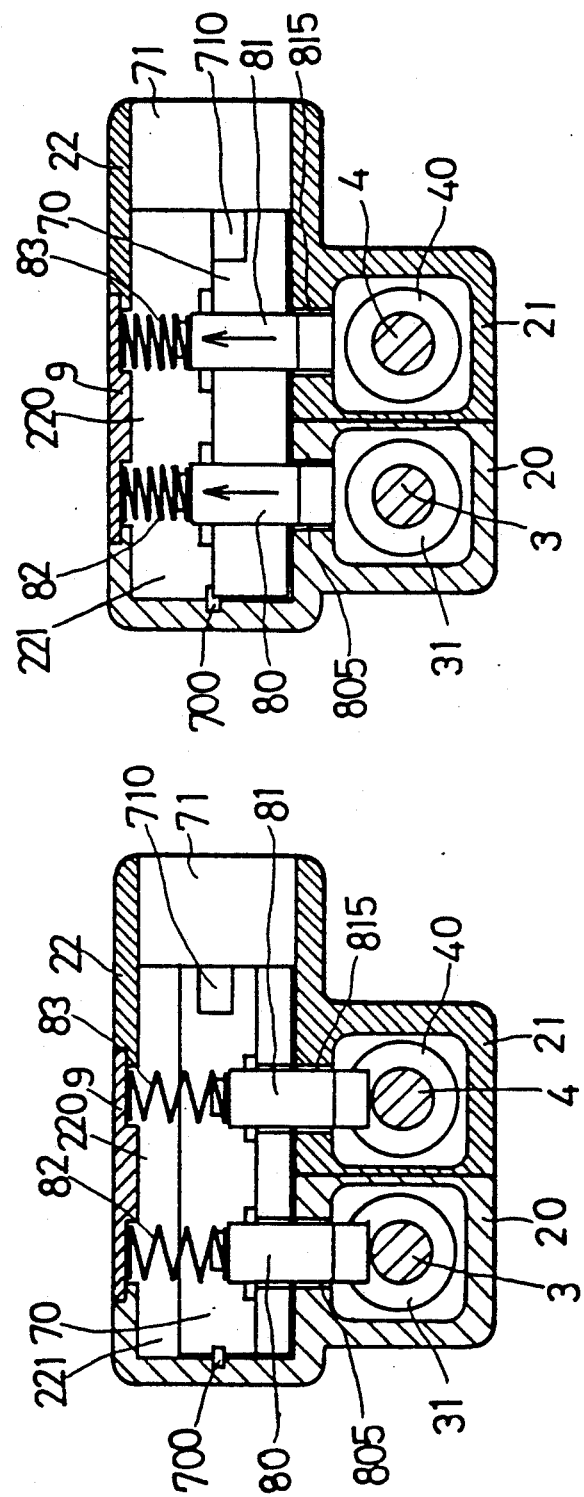

AUTOMOBILE STEERING LOCK

FIELD OF THE INVENTION

The present invention relates to an automobile antitheft device, and more particularly to a device for attachment to an automobile steering wheel to prevent complete rotation of the wheel and securing the automobile against unauthorized driving.

BACKGROUND OF THE INVENTION

Antitheft devices which attach to an automobile steering wheel have been known heretofore, as shown by U.S. Pat. No. 4,738,127 to Johnson. Such antitheft device for attachment to a steering wheel of an automobile includes an elongated body member having a passage way extending along an axis therethrough, an elongated rod member adapted to move in telescopic fashion in the passage way of the body member along the axis, opposed hooks for engaging inside portions of the steering wheel and lock means associated with the body member engaging the rod within the passage way for locking the rod within the passage and stationary with respect to the body member at any of selectable a plurality of positions. While the antitheft device described above is functional, it includes several disadvantages. For example, such device presents pry points wherein a rigid pin or arcuate ruler-like thin objects can be inserted through a gap between the passage and periphery of the rod member to reach a spherical bearing of the lock means and further press it down by overcoming the bias force of a spring member thereon to release it from engaging the rod member in a groove thereof and thereby unlock the device.

SUMMARY OF THE INVENTION

It is accordingly a primary object of this invention to provide an automobile steering lock that overcomes the foregoing disadvantages associated with prior art devices.

Another object of this invention is to provide a locking device wherein the locking mechanism is totally enclosed therein and includes no area susceptible to prying by a crowbar, rigid pin or the like.

A yet further object of this invention is to provide an automobile steering lock having a mechanism for preventing a rod member thereof from being released therefrom.

A further object of this invention is to provide an automobile steering lock which is simple in construction, economical in manufacture and easy in assembly.

BRIEF DESCRIPTION OF THE DRAWINGS

FIG. 3 is an enlarged cross-sectional view taken at an end portion of a body member of the preferred embodiment;

FIG. 4 is an enlarged transverse-sectional view taken at an end portion of the body member;

FIG. 6 is a cross-sectional view of a housing means of the preferred embodiment, shown in a locking condition, and illustrating tenon ends of a pair of rod-like bearings protruding into annular grooves respectively formed in rod members;

FIG. 7 is a cross-sectional view of the housing means of the preferred embodiment, shown in an unlocking condition, and illustrating the tenon ends of the rod-like bearings withdrawn from the annular grooves of the rod members.

DETAILED DESCRIPTION OF THE PREFERRED EMBODIMENT

Figure 1:
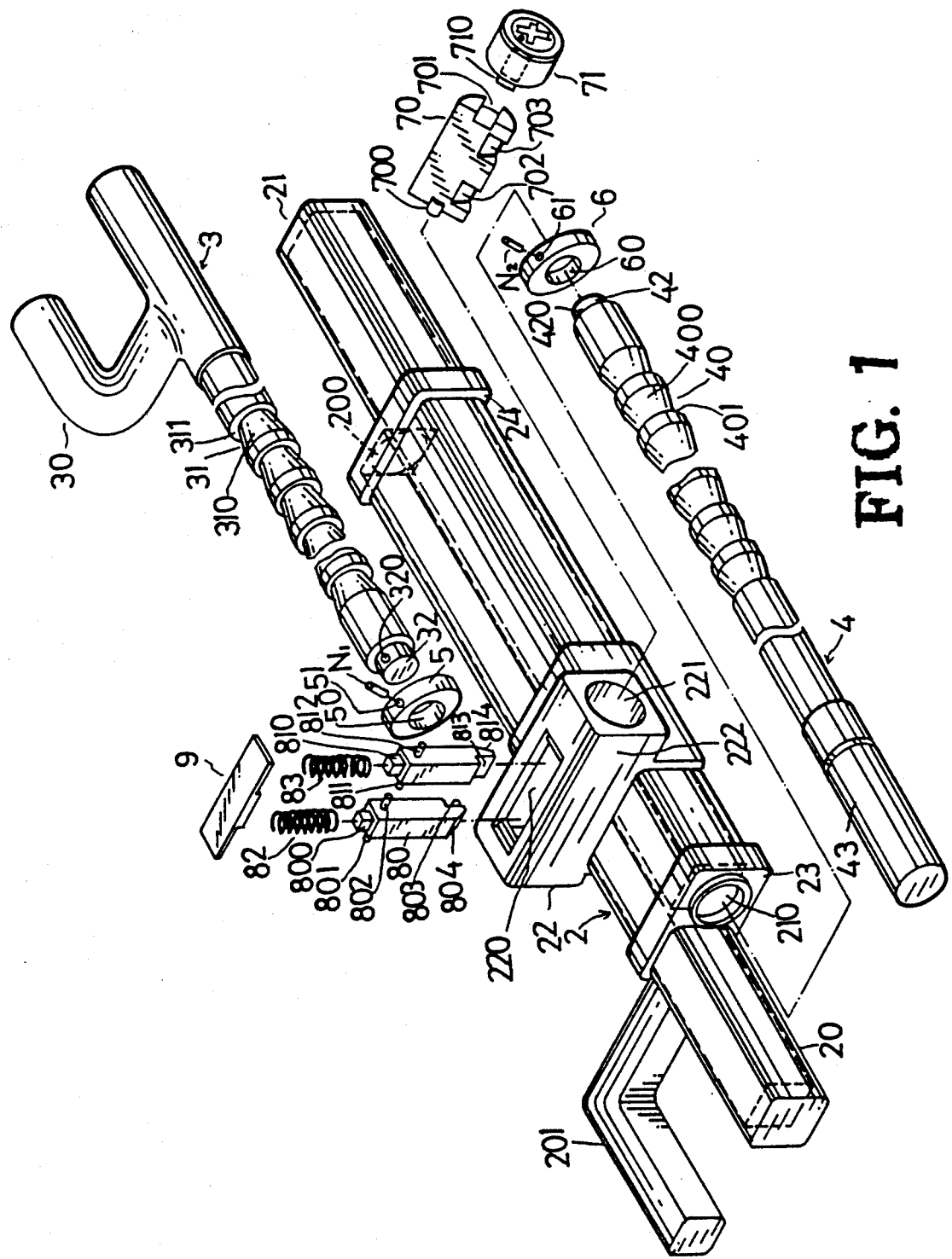
FIG. 1 is a perspective and exploded view of a preferred embodiment of the present invention.
Figure 2:
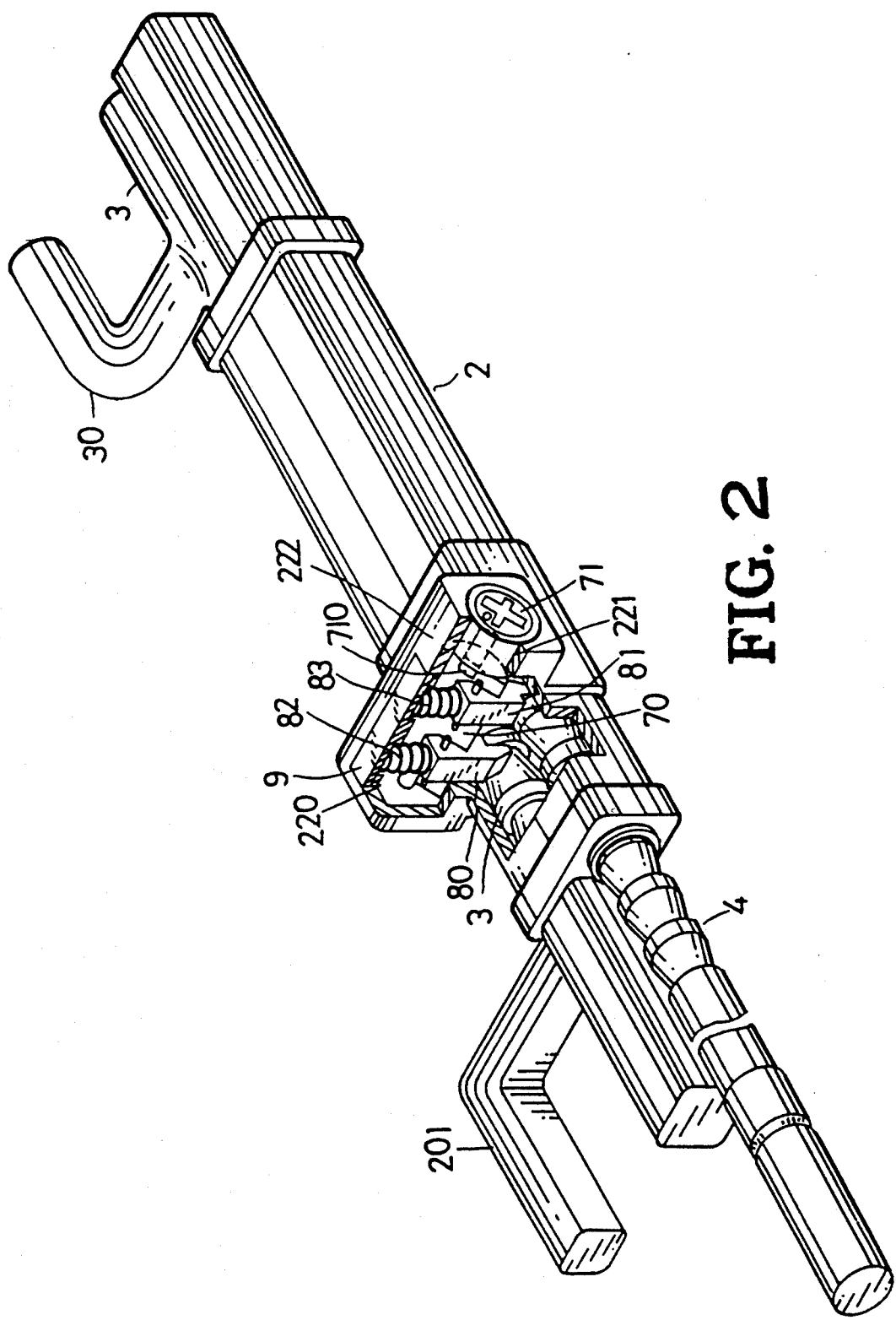
FIG. 2 is a partially broken perspective view of the preferred embodiment in an assembled condition.
Figure 5:
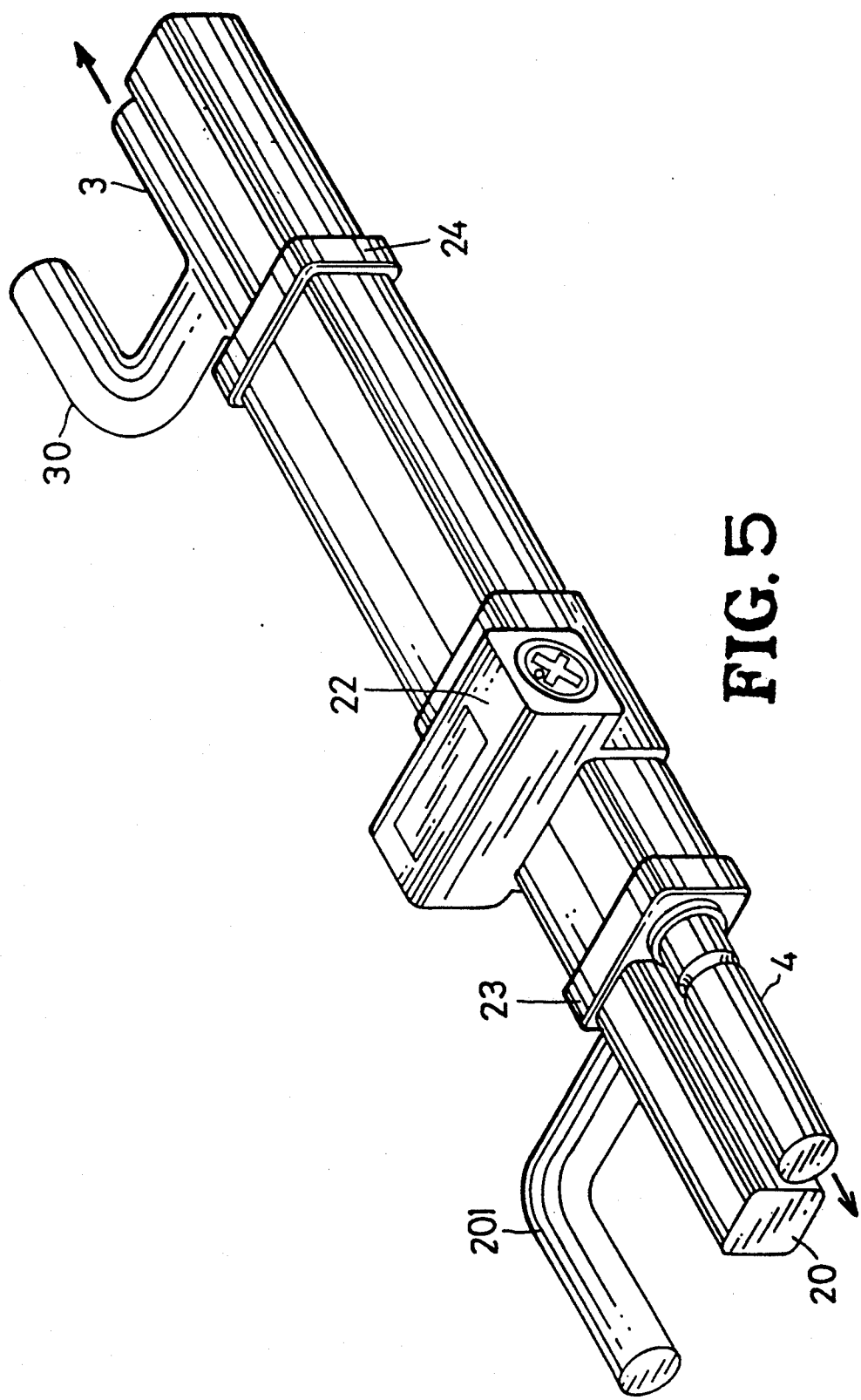
FIG. 5 is a perspective view of the preferred embodiment in an assembled condition.

Referring to FIG. 1, an automobile steering lock according to the present invention comprises an elongated body member 2, which is constituted by two identical elongated tubes 20, 21 of square cross section disposed parallel to end adjacent each other, a first elongated rod member 3 and a second elongated rod member 4 which are dimensioned to move in telescopic fashion within body member 2, first and second hooks 201, 30 for engaging opposed portions of a steering wheel from the inside thereof, being respectively provided on the body member 2 and first rod member 3, a housing 22, and a locking means including a conventional key lock 71, a locking member 70 and a pair of locating means 80, 81 being provided within housing 22 to position and lock rod members 3, 4 stationary with respect to the body member 2 at any one of selectable a plurality of positions.

As described above, the body member 2 includes two identical elongated steel tubes 20, 21 of square cross-section having open ends and closed ends and defining respective central passages running from the open ends to the closed ends. The two tubes 20, 21 are firmly joined together by means of end retainers 23, 24 and welding. Each of the end retainers 23, 24 is formed with a square opening for firmly receiving a tube and a circular opening 210 or 200 communicating the central passage of another tube of which the open end is attached with the end retainer. Openings 200, 210 of the tubes 20, 21 of the body member 2 face opposite in direction so that the first and second rod members 3, 4 telescope in opposite directions with respect to each other from the body member 2.

Figure 8:
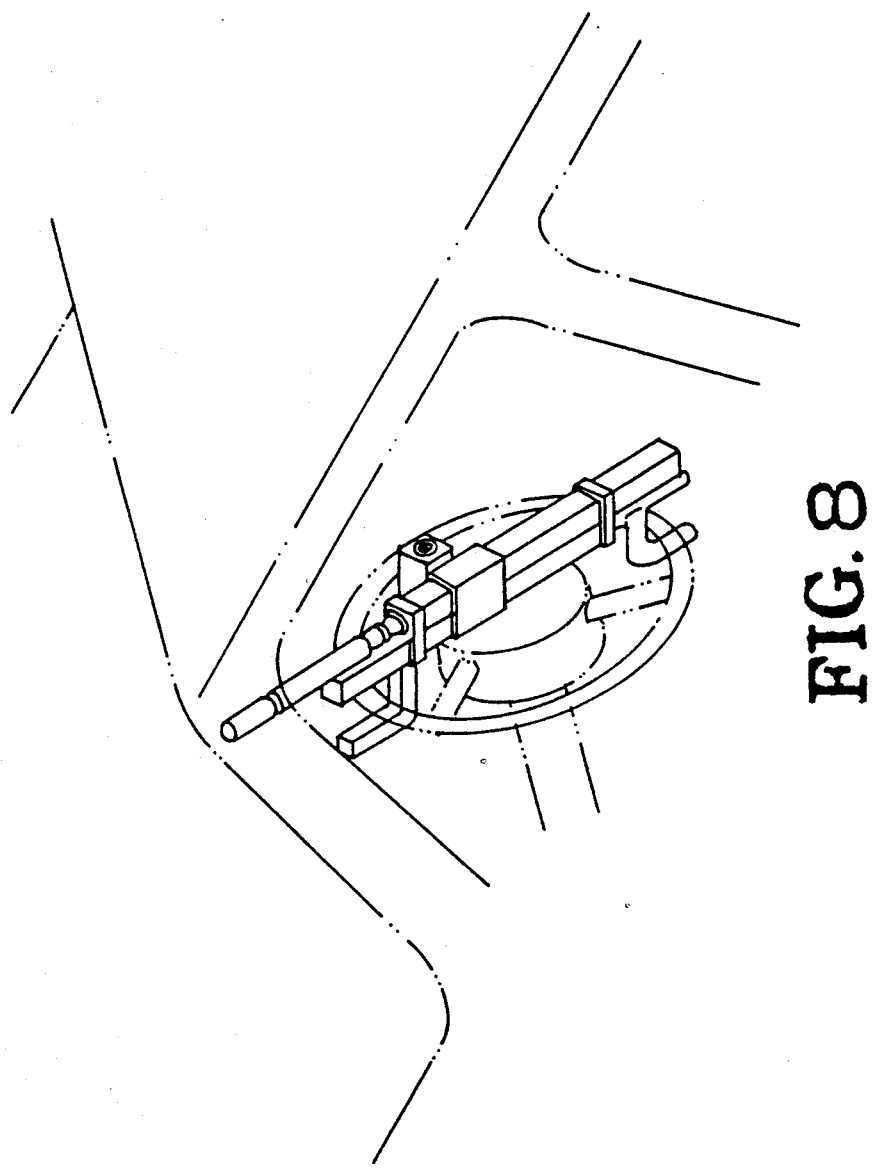
FIG. 8 is a diagramatic perspective view showing the steering lock of the present invention locking the steering wheel of a car.

The first hook 201 is generally an L-shaped member fixedly secured to the tube 20 by means of welding and opens rearwardly along the body member 2 for engagement with a first inside portion of a steering wheel. Said first rod member 3 includes an elongated rod 3 of circular cross-section of which the outer diameter is dimensioned less than the diameter of the first passage in the first tube 20 of the body member 2 and slightly less than the diameter of the circular opening 200 of the end retainer 24 to enable first rod member 3 to telescope freely within the first tube 20. The second hook so is generally an L-shaped member fixedly secured to the front end portion of the first rod member 3 and opens opposite to the hook 201 for engagement with a diametrically opposed second inside portion of a steering wheel, as best shown in FIG. 8. A plurality of annular grooves 31 are longitudinally spaced along a major portion of the first rod member 3. Each of the grooves 31 consists of a vertical side wall 311 substantially perpendicular to the longitudinal axis of first rod 3 and disposed closer to the second hook 30, and a conical or sloping side wall 310 disposed farther from the second hook 30. A cylindrical projection 32 is attached to the end opposite to the hooked end 30 of the first rod 3 and is formed with a radial key hole 320. A guide body 5 of oval shape having a central hole 50 is provided for sleeving around the cylindrical projection 32 and being secured in position by means of a key N1 press-fitted into aligned key holes 51, 320 in the guide body 5 and the projection 32.

Said second rod member 4 is an elongated rod of circular cross-section of which the diameter is dimensioned less than the diameter of the second passage in the second tube 21 of the body member 2 and slightly less than the diameter of the circular opening 210 of the end retainer 23 to enable second rod member 4 to telescope freely within the second tube 21. A handle 43 is secured to the free end of the second rod 4. A plurality of annular grooves 40 are identical to yet reversely arranged with respect to the grooves 31 of the first rod 3, and are longitudinally spaced along a major portion of the second rod member 4. Each of the grooves 40 consists of a vertical side wall 401 substantially perpendicular to the longitudinal axis of the second rod 4 and disposed closer to the handle end 43 and a conical or sloping side wall 400 disposed farther from the handle end 43. A cylindrical projection 42 extending axially is attached to the end opposed to the handle end 43 of the second rod 4 and is formed with a radial key hole 420. A guide body 6 of oval shape having a central hole 60 is provided for sleeving around the cylindrical projection 42 and being secured in position by means of a key N2 press-fitted into aligned key holes 61, 420 in the guide body 6 and projection 42.

The housing 22 includes a boss 222 integrally offset with respect to parallel axes of the central passages in the elongated tubes 20, 21 of the body member 2 and having a bore 221 therethrough into the housing 22 for firmly receiving the locking means which has the conventional key lock 71, projection 710 integrally attached to the inner end of the cylindrical key lock 71, locking member 70 and locating means 80, 81.

As shown in FIGS. 6 and 7, in order to accommodate the locating means 80, 81 a second pair of passages 805, 815 are vertically bored in the lower portion of the housing 22. Said vertical passages 805, 815 interconnect the bore 221 and the respective passages in the elongated tubes 20, 21. A rectangular opening 220, in vertical alignment with the vertical passages 805, 815, is formed in an upper wall of the housing 22 to facilitate inserting the locating means 80, 81. A metal plate 9 is provided to close off opening 220 by means of a press fit after assembly.

As shown in FIGS. 3 and 4, due to confinement of circular opening 200 or 210 on the open end of the tube 20 or 21, the guide body 5 or 6 secured to inner end of the rod member 3 or 4 by means of the key N1 or N2 press-fitted into aligned key holes in the guide body 5 or 6 and cylindrical rear projection 32 or 42 of the rod member 3 or 4 allows the rod member 3 or 4 to telescope in the central passage in the tube 20 or 21 and prevents the rod member 3 or 4 from being released from the tube 20 or 21.

The locking member 70 is a substantially semicircular segment in cross-section and includes an arcuate outer surface, which conforms to the bone 221 in circular inner surface of the housing 22, and a flat top. A recess 701 is formed in a side wall adjacent the key lock 71 and a post 700 serving as an axle of the locking member is formed in an opposite side wall of the locking member 70 to pivotally mounting the locking member 70 in the bore 221 of the housing 22, and two axially spaced-apart notches 702, 703 formed in one side of the locking member 70.

The locating means include two rod-like bearings 80, 81 having projections 800, 810 on the top ends thereof for receiving the lower ends of biasing springs 82, 83, tenon ends defined with vertical side walls 803, 813 and slanting bottoms 804, 814, which are reversely arranged with respect to each other, and extending downwardly towards the passages in the tubes 20, 21, and laterally opposed pivots 801, 802, 811, 812. The upper ends of the biasing springs 82, 83 abut against the inner side wall of the metal plate 9 when the device is in assembled condition.

In assembly, as shown in FIGS. 2 to 7, the rod-like bearings 80, 81 are inserted into the vertical passages 805, 815 through the opening 220 and the cylindrical key lock 71 is firmly received in the bore 221 with the projection 710 thereof fitted in the recess 701 of the locking member 70 such that the locking member 70 is disposed within the bore 221 with the notches 702, 703 thereof vertically in alignment with the vertical passages 805, 815 and opening 220 to support pivots 801, 802, 811, 812 of the rod-like bearings which extend downwardly through the notches 702, 703 and is operable to slide or swing along the circumferential inner surface of the bore 221 by means of the projection 710. The springs 82, 83 are mounted on the tops of the rod-like bearings 80, 81 and disposed in compressed state when the metal plate 9 closes off the opening 220.

In operation, as shown in FIG. 6, the rod-like bearings 80, 81 are biased downwardly by the compressed springs 82, 83 towards respective rods 3, 4 whereas the tenon ends of the rod-like bearings 80, 81 locate in a first position where the flat top of the locking member 70 slants downwardly towards the notched side thereof and protrude into grooves 31, 40 to lock the device. Although in locking condition, the convex or slope side walls 310, 400 of the grooves 31, 40 of the first and second rods 3, 4 allow the rod members 3, 4 of this antitheft device to extend in telescopic fashion with respect to the body member 2 in opposite directions with respect to each other by overcoming biasing forces of the spring members 82, 83. However, the vertical side wall 311 of the first rod member 3 and the vertical side wall 401 of the second rod member 4 abutting the vertical surfaces 803, 813 of the tenon ends of the rod-like bearings 80, 81, prohibit the rod members 3, 4 from retracting back into the body member 2. By so doing, as in locking condition of the antitheft device of the present invention, the first rod member 3 can be extended for engaging opposed portions of a steering wheel with hooks 201, 30, as best shown in FIG. 8, without a key to lock the device. Furthermore, the second rod member 4 can also be extended into a dead corner between the front wind shield and a side window of the car for restricting the steering wheel from complete rotation.

When the locking member 70 of the locking means is oriented about 45 degrees to a bottom segment position where the flat top of the locking member 70 is located in a substantially horizontal position, the notched side of the locking member 70 is raised to lift the rod-like bearings 80, 81 by overcoming the biasing force of the springs 82, 83, as shown in FIG. 7, so as to withdraw the tenon members of the rod-like bearings 80, 81 from annular grooves into vertical passages 805, 815, thus permitting the rod members 3 and 4 to telescope in and out of the body member 2.

In order to prevent the rod members 3, 4 from being accidentally released from the tubes 20, 21 of the body member 2 during pulling of the rod members 3, 4 to extend same into a locking condition, the oval-shaped guide bodies 5, 6 secured to the inner ends of the rod members 3, 4 serve to prevent release of rod members 3, 4 from body member 2 thus avoiding the breaking of the front wind shield of the car and hitting of a passanger sitting nearby. As the diameters of the openings 200, 210 are smaller than the long diameters of the oval-shaped guide bodies 5, 6, the inner ends of the rod members 3, 4 carrying the guide bodies 5, 6 are always confined within their respective central passages in the tubes 20, 21 while permitting either of the rod members 3, 4 to be fully extended from body member 2.

Accordingly, the present invention provides an anti-theft device which is quick and simple to use. It will also be appreciated that the present invention, because of its configuration, presents a formidable obstacle to a potential thief. In this respect, a device according to the present invention provides no external pry points wherein a crow bar or screw driver can be inserted.

While the invention has been described with respect to the preferred embodiment thereof, it is obvious that various modifications can be made therein without departing from the spirit of the present invention which should be limited only by the scope of the claim.

What is claimed is:

1. An anti-theft device for attachment to a steering wheel of an automobile comprising:
    a) a body member defined by a first elongate tubular member having an open end, a closed end and a first passageway extending along its longitudinal axis from the open end to the closed end, and a second elongate tubular member having an open end, a closed end and a second passageway extending along its longitudinal axis from the open end to the closed end, the first and second tubular members being disposed parallel and adjacent to each other, with the open ends of the tubular members facing in opposite directions;
    b) the body member including a first hook portion extending from the first tubular member for engaging a first inside portion of a steering wheel and disposing the closed end of the second tubular member at a distance from the periphery of the wheel;
    c) a retaining member attached to the open end of each of the first and second tubular members for securing the tubular members together, and the retaining members including openings disposed in alignment with the first and second passageways;
    d) a first elongate rod member having an inner end and an outer end, the inner end being receivable within the first passageway to telescopically dispose the first rod member therein and through the opening formed in the corresponding retaining member attached to the open end of the first tubular member, the outer end of the first rod member including a second hook portion for engaging a second inside portion of the wheel opposite to the first inside portion, the first rod member including a plurality of longitudinally spaced annular grooves, each annular groove being defined by a vertical sidewall perpendicular to the longitudinal axis of the first rod member and positioned closer to the outer end thereof and a conical sidewall positioned farther from the outer end thereof;
    e) a second elongate rod member having an inner end and an outer end, the inner end being receivable within the second passageway to telescopically dispose the second rod member therein and through the opening formed in the corresponding retainer member secured to the open end of the second tubular member, the second rod member including a plurality of longitudinally spaced annular grooves, each annular groove being defined by a vertical sidewall disposed perpendicular to the longitudinal axis of the second rod member and closer to the outer end thereof and a conical sidewall disposed farther from the outer end thereof;
    f) a housing means including a boss provided with a transverse cylindrical passageway extending therethrough and having a longitudinal axis offset with respect to the parallel axes of the first and second elongate passageways, and a pair of vertical passageways interconnecting the cylindrical passageway with the first and second passageways;
    g) a lock disposed in the housing means, the lock including an inner end and a projection formed on the inner end;
    h) a locking member having a semicircular cross-section, the locking member including an arcuate outer surface conforming to the cylindrical passageway in the boss, a flat top, an end wall, a recess formed in the end wall for engagement by the projection of the lock, a sidewall, and a pair of spaced notches formed in the sidewall and disposed in alignment with the pair of vertical passageways, whereby the locking member is disposed to swing between an unlocking position wherein the locking member occupies a bottom portion of the cylindrical passageway and the flat top is maintained substantially in a horizontal disposition, and a locking position wherein the locking member occupies a side portion of the cylindrical passageway and the flat top is disposed in a downward slant towards the pair of spaced notches;
    i) bearing means including a pair of rod-like bearings slidably received through the vertical passageways and the notches in the locking member, each bearing including a pair of opposed pivots at a top end thereof, the two pairs of opposed pivots being disposed in engagement against the flat top of the locking member, each bearing including a tenon member at a bottom end thereof, the bearings being actuated by the locking member whereby when the locking member is disposed in the locking position, the tenon members engage selected annular grooves in the first and second rod members and, when the locking member is in the unlocking position, the tenon members are withdrawn from the annular grooves; and
    j) spring means for biasing the bearing means toward the first and second rod members.

2. The anti-theft device of claim 1 wherein the inner end of each of the first and second elongate rod members includes an oval-shaped guide body slidably disposed in the corresponding elongate passageway for guiding the telescopic movement of the rod member within the passageway.

3. The anti-theft device of claim 2 wherein the larger diameter of each oval-shaped guide body exceeds the diameter of the opening in the corresponding retaining member to prevent release of the rod member from its passageway.

* * * * *